United States Patent [19]
Lehmann

[11] 3,903,533
[45] Sept. 2, 1975

[54] PHOTOGRAPHIC CAMERA AND FLASH LAMP SELECTION SYSTEM

[75] Inventor: Walter G. Lehmann, Somerville, Mass.

[73] Assignee: Polaroid Corporation, Cambridge, Mass.

[22] Filed: Dec. 26, 1973

[21] Appl. No.: 427,938

[52] U.S. Cl. ............... 354/126; 240/1.3; 315/241 P
[51] Int. Cl. .......................................... G03b 15/03
[58] Field of Search ........... 354/126, 127, 128, 143, 354/147; 240/1.3; 315/241 P

[56] References Cited
UNITED STATES PATENTS

| | | | |
|---|---|---|---|
| 3,430,545 | 3/1969 | Wick | 354/127 R |
| 3,438,315 | 4/1969 | Goshima et al. | 354/143 R |
| 3,518,487 | 6/1970 | Tanaka et al. | 354/143 X |
| 3,608,451 | 9/1971 | Kelem | 354/143 R |
| 3,619,715 | 11/1971 | Kim | 354/143 X |

*Primary Examiner*—Robert P. Greiner
*Attorney, Agent, or Firm*—Michael Bard; John W. Ericson

[57] ABSTRACT

A photographic camera and multi-flash arrangement therefor in which a multiplicity of linearly arrayed flash lamps mounted in a cartridge, wherein one or more of said lamps may be inoperative, may be automatically and sequentially sampled and the operative ones of said lamps automatically selected for effecting a photographic exposure.

33 Claims, 4 Drawing Figures

PHOTOGRAPHIC CAMERA AND FLASH LAMP SELECTION SYSTEM

BACKGROUND OF THE INVENTION

This invention relates generally to photographic apparatus employing means for artificially illuminating a scene to be photographed and, more particularly, to photographic apparatus employing means for automatically selecting operative flash lamps, from an array comprising both operative and inoperative flash lamps, for effecting a photographic exposure.

Photographic flash systems in which a plurality of flash lamps are assembled within a disposable mounting have been favorably received by the consuming public. Certain of these mountings are fashioned as a cubic package in which four flash lamps and associated reflectors face outwardly through four surfaces of the cubic form and have come to be known as "flashcubes". The surfaces are moved sequentially into a flash illuminating orientation by a mechanical rotation assembly coupled with an exposure mechanism of a camera. Sequential switching between the flash lamps within the cube is accomplished as an adjunct to the mechanical rotation of the lamp mounting. Should an inoperative flash lamp be encountered in the course of taking flash illuminated photographs with the cube, the attempted exposure will be aborted, usually with an attendant loss of a frame of film.

In another multiple flash lamp arrangement, a plurality of flash lamps are mounted as an array within a singular disposable package. Typically, these units include a base member which supports a coplanar array of flash lamps and individual lamp reflectors behind each lamp. The lamps may be arranged in a single row, i.e., a linear array, or in other embodiments may be disposed in two or more interdigitated or parallel rows. The base member is adapted to be connected to a socket on the camera which aligns all of the lamps on the array in a direction such that their light output is substantially parallel with the optical axis of the camera's objective lens. The base member generally includes an insulating terminal board which supports a plurality of thin film conductive paths that are connected at one end to the lamp filament wires. Generally, there is one common conductive path to which one end of all of the lamp filaments are connected. The opposite end of the lamp filaments are each connected to their own individual conductive path. Accordingly, contact to any lamp in the array may be made by making contact simultaneously to the common path and the individual paths.

Linearly arranged multiple flash lamp arrays such as described above have comee to be known as "Flash-Bars" and in operation all of the lamps are oriented for providing scene illumination when ignited without recourse to moving or rotating either the flash lamps or their mountings between exposures. Examples of the type of multi-lamp flash units broadly described above may be found in U.S. Pat. Nos. 3,598,984 issued to Slomski and 3,598,985 issued to Harnden et al. on Aug. 10, 1971. Since no relative movement of the flash lamps is involved between exposures, switching systems are required to cause synchronous igniting of individual bulbs with each actuation of a photographic exposure system. Generally, firing circuits are provided which sequentially ignite the bulbs in a predetermined order from first to last with each actuation of a flash shutter synchronization switch. For example, U.S. Pat. No. 3,608,451, issued to Kelem on Sept. 28, 1971, discloses the use of a multi-contact switch having a rotary contact wiping member. The common lamp terminal is connected to one electrode of a battery within the camera. The individual lamp terminals are each connected to a separate contact on the switch. The contact wiping member is connected to the other battery electrode through a normally open flash ignition switch. After one lamp has been ignited, the flash lamp ignition switch is reopened and the contact wiping member is rotated one station to connect the next lamp in the array to the flash firing circuit.

In another arrangement, Goshima et al. in U.S. Pat. No. 3,438,315, issued on Apr. 15, 1969, discloses a multi-flash arrangement for cameras in which a plurality of flashbulbs can be either automatically or manually connected to a firing circuit. The firing circuit includes a battery and capacitor, a flash synchronizing contact, and a mechanical switch arm. The switch arm connects each of the flashbulbs sequentially to the firing circuit and is adapted for automatically switching as the film advances or for manual selection of the flashbulbs by a selector switch on the face of the camera.

A variety of other sequencing circuits for firing flashbulbs in successional order have been proposed. In one category of these circuits, sensing elements are arranged to respond to the heat or light output of an igniting flashbulb by varying either a mechanical or electrical parameter. Following this parameter variation, the circuits enable or arm select lamps within an array for successive firing. In most cases, however, such sequencing devices are either self-destructing when used or require excessive packaging volumes for camera mounted applications. Additionally, the systems are incapable of bypassing any inoperative flashbulbs which may be present in an array.

In still another arrangement, a cascading assembly of electrical resistors or the like is selectively coupled within a grouping of flash lamp circuits. During operation, lamp igniting currents are selectively attenuated to cause the flash lamps within the circuits to be fired in succession. In addition to being somewhat insensitive to any variations in power supply or circuit performance, this form of successive system is also incapable of bypassing inoperative flash lamps within an array and must rely on an open circuit condition at the terminals of any expended lamp to continue a lamp sequencing function.

In U.S. Pat. No. 3,618,492, issued to Ellin on Nov. 9, 1971, a photographic flash exposure system is described which is operative to sequentially ignite individual lamps within an array of flash lamps. The system automatically passes a monitoring current through each of the flash lamps during each exposure cycle to derive alignment signals which function to align a flash lamp sequencing circuit to bypass inoperative flash lamps. The Ellin device, while workable, provides a system of complex electronic networks and it is both difficult of manufacture and expensive.

In my copending application Ser. No. 427,812 filed on even date and commonly assigned herewith, there is described an electromechanical system for automatically selecting operative flash lamps from an array of operative and inoperative lamps. This system, while simple and effective, requires that a switch be mechanically reset each time a flash lamp is ignited, an obvious inconvenience and source of potential malfunction.

SUMMARY OF THE INVENTION

The present invention is addressed to a flash lamp selecting system for use in conjunction with a photographic camera operable to effect photographic exposures in both an ambient illumination and photoflash lamp illumination mode. A plurality of electrical contacts are fixedly disposed within a photographic camera and each of said contacts is electrically to one terminal of a discrete one of a plurality of photoflash lamps when a flash lamp array is appropriately inserted into a socket assembly provided on the camera. The other terminals of each of said flash lamps are electrically connected via a common path (upon insertion of the lamp array into the socket assembly aforesaid) to the negative terminal of a battery power supply.

The positive terminal of the battery is permanently serially connected through a switch latch to a rotary wiper arm connected within the camera and adapted to rotate past and successively engage each of the electrical contacts aforesaid.

The switch latch includes a latching solenoid which is connected to a plurality of retaining fingers so as to move said fingers from an initial position to a position interdigitated with said plurality of electrical contacts and extending in the path of said wiper arm. The latching solenoid will cause the fingers to remain in this latter position until it is reset.

An additional standby electrical contact is provided within the camera and is not connected to any of the flash lamps. The standby contact merely serves as a resting position for the rotary wiper arm. The rotary wiper arm is connected via a shaft through a spring motor to a control knob disposed on the outside of the photographic camera. A pawl assembly is disposed within the camera and is operatively connected to the shutter actuator button and to a ratchet wheel which is fixedly secured to the shaft.

In operation, the control knob is rotated counterclockwise to wind up the spring motor and the rotary wiper arm is initially secured at the standby contact by means of the pawl and ratchet assembly.

Upon depression of the shutter release button, the pawl will disengage the ratchet wheel permitting the shaft to be rotated in a clockwise direction by the spring motor causing the rotary wiper assembly to successively engage each of the plural electrical contacts connected to each of the flash lamps. At the same time, the shutter release button will reset the solenoid if the fingers are not already in their initial position. The rotary wiper will continue its clockwise travel until it has engaged the electrical contact connected to the first operative flash lamp, at which time the lamp will be serially connected to the battery and will ignite. Upon such ignition, a current pulse will activate the latching solenoid causing the fingers to move into a position intercepting the path of the wiper arm. The wiper arm will be restrained from further rotary movement and will not be able to engage the contact connected to the next succeeding lamp until the shutter release button is again depressed so as to reset the solenoid. At this time, the fingers will return to their initial position and the wiper arm will successively engage said contacts until the next operative lamp is ignited. The process will repeat itself until the next to last of the lamps has been ignited.

Inasmuch as there is no finger to intercept the path of the wiper arm following its movement past the last contact, actuation of the shutter release button after ignition of the next to last of the lamps will permit the wiper arm to continue to rotate until it has returned to the standby contact. The release of the shutter actuator button by the operator following its momentary depression will release the pawl so that it may engage the ratchet wheel and thus the wiper arm will be held in its initial position by the pawl and ratchet assembly until a new cycle is commenced. After a predetermined number of cycles have been completed, rewinding of the spring motor may be effected through rotation of the control knob, care being taken to insure that the solenoid has been reset and that the lamps are disconnected. Thus, only one flash lamp may be fired following actuation of the shutter release button and the lamps in the array will be sequentially sampled following each such actuation until an operative lamp is ignited.

Accordingly, it is an object of the present invention to provide a new and improved, easily fabricated, and low-cost mechanism for automatically and sequentially sampling each of the lamps in an array of lamps and selectively igniting an operative one of said lamps during each photographic exposure.

Another object of the present invention is to provide an improved electromechanical mechanism for automatically selecting operative flash lamps from amongst an array of operative and inoperative flash lamps.

Still another object of the present invention resides in the provision of improved means for use with a photographic camera operable in a photoflash mode for preventing the abort of a photographic cycle due to the presence of an inoperative flash lamp in an array of flash lamps connected to the camera.

DESCRIPTION OF THE DRAWINGS

Other objects and many of the attendant advantages of the instant invention will be better appreciated and said invention will become clearly understood by reference to the following detailed description when considered in conjunction with the accompanying drawings illustrating one embodiment of the instant invention, wherein.

DETAILED DESCRIPTION OF THE INVENTION

Figure 1:
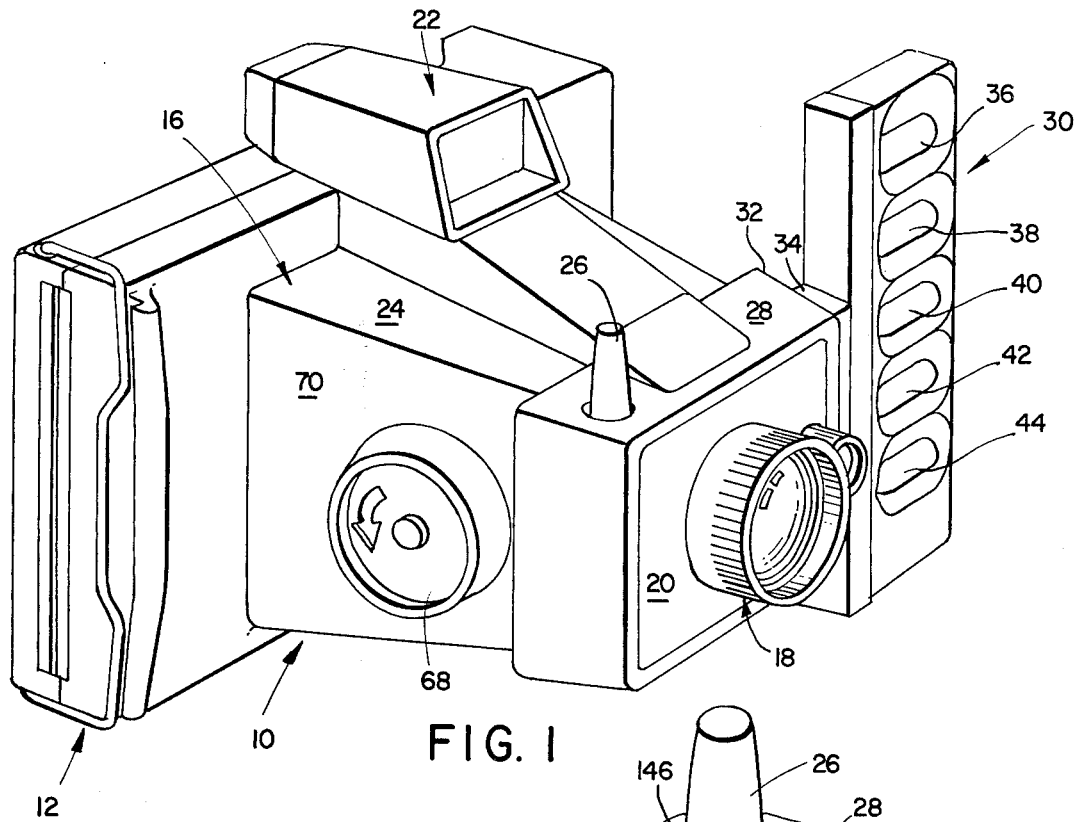
FIG. 1 provides a simplified perspective of a photographic camera employing the subject invention.

Referring to the drawings in more detail, and more particularly to FIG. 1, a photographic camera is illustrated generally at 10 and is seen to include a back portion 12 for receiving a film cassette (not shown) and an exposure control system housing 14. The exposure control system housing 14 is connected to the back portion 12 by means of a central portion 16 which is configured to define a lighttight exposure chamber housing. An objective lens assembly 18 which is disposed within a forward wall portion 20 of the exposure control system housing 14 functions to transmit light from a subject through the exposure chamber defined by the central portion 16 to properly expose a film unit within the back portion 12. The camera 10 is further provided with a viewfinder assembly 22 secured to a top wall portion 24 of the exposure chamber housing 16, and a shutter actuator button 26 for initiating a photographic exposure (in a well-known manner) is secured partially within the exposure control system housing 14 and extends upward through a top wall portion 28 of said housing 14 to be accessible to a user.

Figure 2:
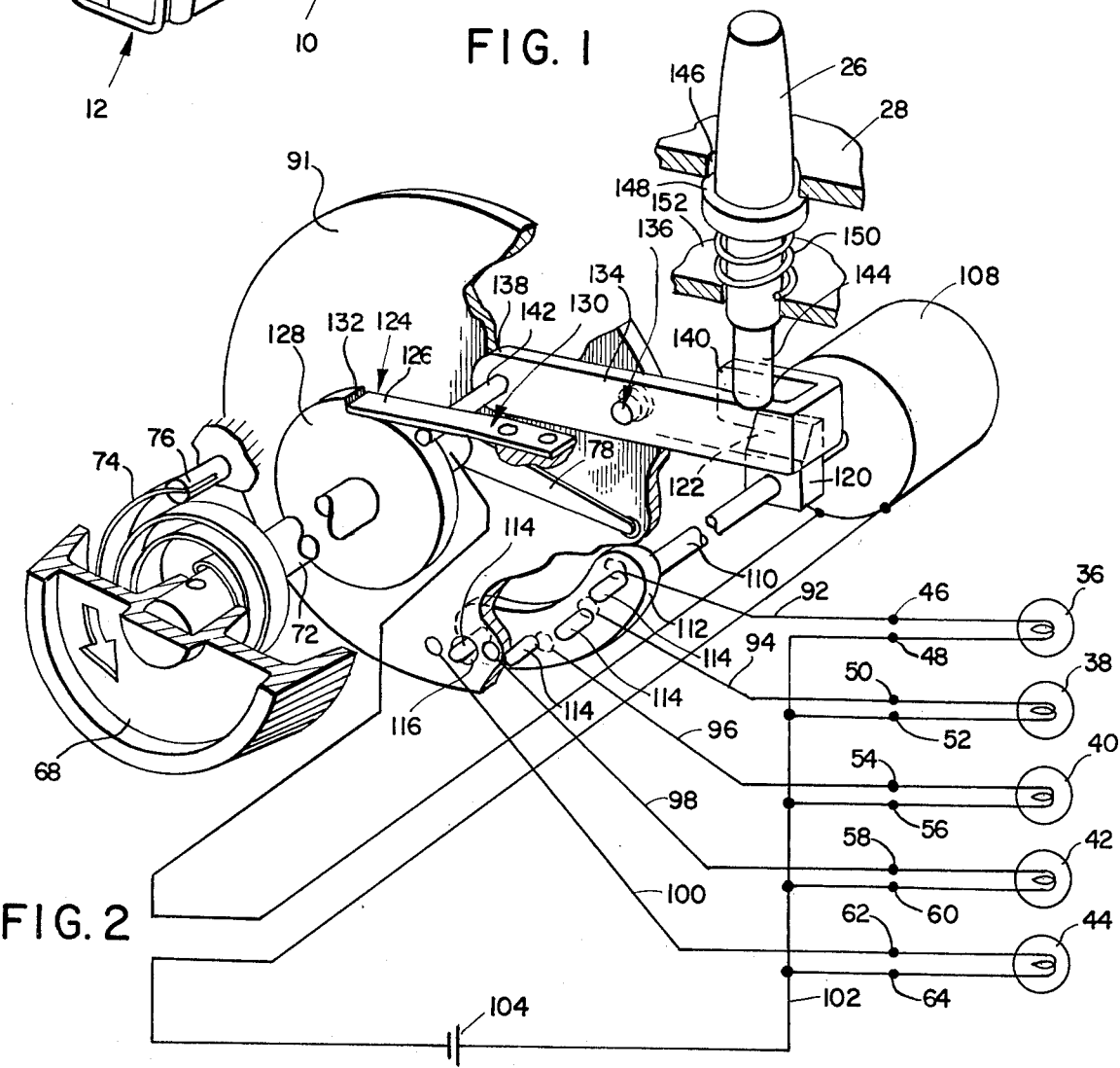
FIG. 2 provides a diagrammatic exploded perspective of the novel flash selection system of the subject invention.
Figure 3:
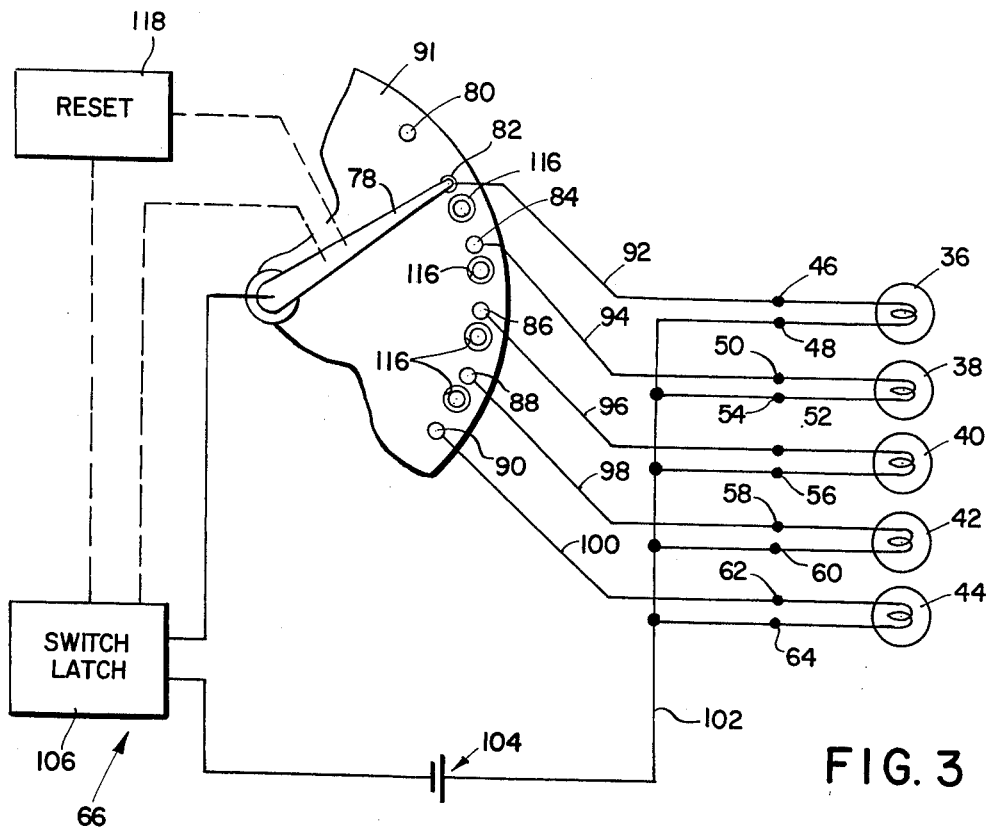
FIG. 3 provides a simplified schematic of the subject invention.

A Flash-Bar 30 such as is manufactured by the General Electric Company and readily available throughout the United States is shown secured to a side wall 32 of the housing 14 via a socket assembly 34 which releasably retains the Flash-Bar 30 in a conventional and well-known manner. As best seen in FIG. 1, and as is commonly known, a plurality of flash lamps 36, 38, 40, 42, and 44 are disposed in a linear array within the Flash-Bar 30, and as schematically illustrated in FIGS. 2 and 3, each of the flash lamps 36, 38, 40, 42, and 44 are provided with a pair of input terminals 46 and 48, 50 and 52, 54 and 56, 58 and 60, and 62 and 64, respectively.

The novel flash selection system of the subject invention is illustrated generally at 66 and is seen to include a control knob 68 positioned outward of a side wall portion 70 of the exposure chamber housing 16 and which is secured to one end portion of a shaft 72 in a well-known manner. The shaft 72 extends through the side wall 70 and its end portion adjacent the control knob 68 is secured to one end portion of a spring motor 74, the other end portion of which is fixedly secured within the exposure chamber housing 16 in a well-known manner, as at 76. The end portion of the shaft 72 remote from the control knob 68 is fixedly secured to an electrically conductive wiper arm 78 in a well-known manner and the wiper arm 78 extends radially outward from the shaft 72 and is rotatable therewith.

A plurality of electrical contacts 80, 82, 84, 86, 88, and 90 are secured to a circular insulating plate 91 and are radially disposed about the shaft 72 in a well-known manner so as to lie along a segment of a circle whose radius is approximately equal to the length of the conductive wiper arm 78. The electrical contacts 82, 84, 86, 88, and 90 are connected via the conductive paths 92, 94, 96, 98, and 100, respectively, to the input terminals 46, 50, 54, 58, and 62, respectively, of the flash lamps.

Before proceeding, it should be noted that the wiper arm 78, the contacts 80 through 90, and the conductive paths 92 through 100 may be disposed within or without the photographic camera 10 in any conventional manner and for convenience and aesthetic reasons in the embodiment illustrated in FIG. 1 are disposed within the photographic camera 10. Furthermore, it will be noted that there is no conductive path between the contact terminal 80 and any of the input terminals to the flash lamps 36 through 44. As will be more apparent, infra, the contact terminal 80 serves as a standby terminal for the initiation and termination of the lamp selection process.

As best seen in FIGS. 2 and 3, each of the input terminals 48, 52, 56, 60, and 64 of the flash lamps 36, 38, 40, 42, and 44, respectively, are connected to a common conductive path 102. The negative terminal of a battery 104 is connected to the common conductive path 102 while the positive terminal of the battery 104 is electrically connected through a switch latch 106 to the end of the electrically conductive wiper arm 78 fixed to the shaft 72 as by a brush and ring assembly (not shown) in a conventional manner. The switch latch 106 includes a latching solenoid 108 having a shaft 110 which is fixedly connected at one end to an arcuate plate 112 (FIG. 2). The plate 112 includes a plurality of fingers or prongs 114 fixedly secured thereto in registration with a plurality of apertures 116 in the plate 91 (FIG. 3) which are interdigitated with the electrical contacts 82, 84, 86, 88, and 90 such that one aperture 116 is positioned between the contacts 82 and 84, another aperture 116 is positioned between the contacts 84 and 86, a third aperture 116 is positioned between the contacts 86 and 88, and a fourth and final aperture is positioned between the contacts 88 and 90. The operation of the switch latch 106 is such that in response to an electrical signal the solenoid 108 will extend the shaft 110 and the plate 112 so as to move the fingers 114 from an initial position clear of the plate 91 (not shown) to the position illustrated in FIG. 2 extending through their corresponding apertures 116 and intercepting the path of the wiper arm 78.

Inasmuch as the solenoid is of the latching variety, the fingers 114 will remain in the position shown in FIG. 2 until the switch latch 106 is reset to the initial position (not shown) by a reset assembly shown schematically at 118 in FIG. 3. The reset assembly 118 includes a cam member 120 (FIG. 2) which is fixedly secured to the shaft 110 and which is provided with a ramp surface 122, the function of which will become more apparent, infra.

The flash selection system 66 is initially in the position shown in FIG. 2 with the wiper arm 78 in contact with the standby electrical contact 80 and is releasably stored in this position by means of a pawl and ratchet assembly 124 which is seen to include a cantilevered spring member 126 and a ratchet wheel 128. One end portion of the cantilevered spring member 126 is fixedly secured within the exposure chamber housing 16 as at 130 in a well-known manner, while the other end portion of the spring member 126 abuts a single arcuate tooth 132 which extends above the periphery of the ratchet wheel 128. A control lever 134 is pivotally secured within the exposure chamber housing 16 as at 136 and extends to opposite end portion 138 and "L"-shape end portion 140, respectively. A pin 142 is fixedly secured to the end portion 138 of the control lever 134 and extends under the cantilevered spring member 126 so as to just contact same in the position shown.

It will be recalled that the shutter actuator button 26 extends partially within the exposure control system housing 14 and as best seen in FIG. 2 the shutter actuator button 26 extends to an elongated end portion 144 which engages the "L"-shape end portion 140 of the control lever 134. The shutter actuator button 26 extends through an aperture 146 in said housing 14 and is secured within said housing 14 by means of a collar 148 and a coil spring 150. The coil spring 150 is disposed about the central portion of the shutter actuator button 26 and extends between the collar 148 and a frame member 152 secured within the housing 14 and is preloaded so as to urge the collar 148 (which is of a diameter larger than that of the aperture 146) into abutment with the inner face of the top wall 28.

Considering the operation of the subject invention in more detail, it will be assumed that the mechanism is in position as shown in FIG. 2 with the wiper arm 78 contacting the standby contact 80 and the switch latch 106 (FIG. 3) energized so that the fingers 114 extend through the apertures 116 intercepting the path of the wiper arm 78. Assume now that the user has properly framed his subject in the viewfinder 22 and has determined to initiate an exposure. Assume further that one or more of the flash lamps 36, 38, 40, 42, and 44 are inoperative.

To commence an exposure, the user will depress the shutter actuator button 26 which will pivot the control lever 134 as the elongated end portion 144 of the actuator button 26 pushes downward on the "L"-shape end portion 140 of the control lever 134. Such clockwise movement of the control lever 134 will cause the pin member 142 extending from the end portion 138 thereof to lift the cantilevered spring 126 clear of the tooth 132 of the ratchet wheel 128, thus freeing the wheel and the shaft 72 secured thereto to rotate in a clockwise direction (looking into FIG. 2) under the influence of the spring motor 74. As the spring motor 74 begins to unwind driving the shaft 72 and the ratchet wheel 128 in a clockwise direction, the user will have released the button 26 which will be returned to its uppermost position by the coil spring 150. The upward movement of the shutter actuator button 26 will cause its elongated end portion 144 to permit the control lever 134 to pivot in a counterclockwise direction under the influence of the cantilevered spring 126 in abutment with the pin 142 and such counterclockwise movement of the control lever 134 will permit the end portion of the cantilevered spring 126 to contact the periphery of the ratchet wheel 128 and not again engage the tooth 132 until the ratchet wheel 128 and the shaft 72 have completed one revolution.

Figure 4:
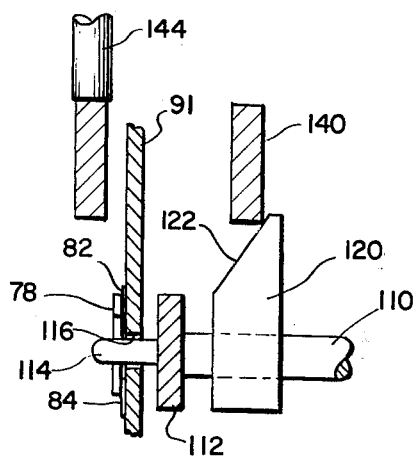
FIG. 4 provides a fragmentary detail, partly in section, of a portion of the mechanism of FIG. 2.

As best seen in FIG. 4, with the system in the position shown in FIG. 2, the "L"-shape end portion 140 of the control lever 134 will abut the ramp surface 122 of the cam member 120. Thus, as the control lever 134 begins to pivot under the influence of the actuator button 26, the "L"-shape end portion 140 will drive the cam member 120 and the shaft 110 (which is secured thereto) to withdraw the fingers 114 from the apertures 116 and reset the switch latch 106.

Upon the resetting of the switch latch 106, the fingers 114 will no longer intercept the path of the wiper arm 78 which will now be free to rotate in a clockwise direction under the influence of the spring motor 74.

Thus, upon the momentary depression of the shutter actuator button 26, the wiper arm 78 will be caused to rotate in a clockwise direction with the shaft 72 starting from the standby contact 80 sequentially engaging the contacts 82, 84, 86, 88, and 90. Until such time as the wiper arm 78 engages one of the electrical contacts 82 through 90 associated with an operative flash lamp, the electrical path through the switch latch 106 will remain open-circuited and there will be no current through the solenoid 108. At such time as the wiper arm 78 engages one of said contacts 82 through 90 associated with an operative one of said flash lamps 36 through 44, the electrical path through the switch latch 106 will be completed, the lamp will ignite, and a current pulse will flow through the solenoid 108. The pulse of current through the solenoid 108 will cause it to latch into the position illustrated in FIG. 2 and the fingers 114 will intercept the path of the wiper arm 78 such that the finger 114 immediately following the contacts 82 through 90 associated with the ignited flash lamp will engage the wiper arm 78 and prevent further rotation thereof to the remaining contacts 82 through 90 until the shutter actuator button 26 is again depressed.

The foregoing sequence will repeat itself each time the button 26 is depressed until the last operative one of the flash lamps 36 through 44 is ignited. At this time, the wiper arm 78 will either automatically and immediately return to the standby contact 80 where it will be releasably retained by the pawl and ratchet assembly 124 or it will return to said standby contact 80 following the next depression of the button 26. More specifically, if the lamp 42 is operative and the lamp 44 is not, the wiper arm 78 will be engaged by one of the fingers 114 following the ignition of the lamp 42, as aforesaid. The arm 78 will not be released until the switch latch 106 is reset by again depressing the button 26. When the latch 106 is so reset, the wiper arm 78 will be free to rotate to the standby contact 80 where it will be retained by the pawl and ratchet assembly 124.

If, however, the lamp 44 is operative, the circuit path through the switch latch 106 will be completed when the wiper arm 78 engages the contact 90, the lamp 44 will be ignited, and the solenoid 108 will be latched into the position shown in FIG. 2. It will be recalled however, that there is no finger 114 or corresponding aperture 116 following the contact 90 and, hence, following ignition of the lamp 44 the wiper arm 78 will be free to move directly to the contact 80 where it will be releasably retained, as aforesaid.

When the wiper arm 78 reaches the standby contact 80, the solenoid 108 will be latched in the position of FIG. 2 only if the lamp 44 was ignited. Otherwise, the solenoid 108 would have been reset after ignition of the last operative one of the lamps 36 through 42.

Thus, it is seen that the flash selection system 66 will select and ignite only a single operative one of the flash lamps 36 through 44 in response to a momentary depression of the shutter actuator button 26. Accordingly, only one flash lamp will be ignited during each photographic cycle (which, of course, is initiated by depression of the shutter actuator button 26 in a well-known manner) and as long as one of the flash lamps 36 through 44 is operative, it will be selected and properly ignited so that a photographic cycle will not be aborted due to the presence of an inoperative flash lamp.

It should be noted that the spring motor 74 may be so designed as to store sufficient energy for a desired multiple of photographic cycles. In any event, there will come a time such that when the wiper arm 78 has completed a cycle and come to rest at the standby contact 80, insufficient energy will remain stored in the spring motor to cause the wiper arm 78 to sweep the contacts 82, 84, 86, 88, and 90 and return to its standby position. At this time, it is merely necessary for the user to rotate the control knob 68 in a counterclockwise direction a sufficient number of full turns to store the necessary driving energy for the system.

In order to rewind the spring motor 74, however, it is necessary to first insure that the switch latch 106 has been reset and that there are no operative flash lamps connected to the conductive paths 92 through 102. Such conditions may be insured by both removing the array 30 from the socket assembly 34 and depressing the button 26 prior to rewinding the control knob 68.

It can readily be seen that many variations and modifications of the present invention are possible in the light of the aforementioned teachings, and it will be apparent to those skilled in the art that various changes in form and in arrangement of components may be made to suit requirements without departing from the spirit and scope of the invention. It is, therefore, to be understood that within the scope of the appended claims the instant invention may be practised in a manner otherwise than is specifically described herein.

What is claimed is:

1. A photographic camera operable in conjunction with an array of flash lamps and a power supply for effecting artificially illuminated photographic exposures, including:
   means connected to said camera for releasably receiving said array and electrically contacting said lamps;
   means connected to said camera for initiating a photographic exposure cycle;
   means connected to said initiating means for sequentially connecting said power supply to discrete ones of said lamps in said array via said contacting means during a single exposure cycle until one of said lamps is ignited; and
   means for disabling said sequentially connecting means upon ignition of said one of said lamps.

2. The invention pursuant to claim 1, further including means for resetting said disabling means and enabling said sequentially connecting means to permit the ignition of another one of said flash lamps.

3. The invention pursuant to claim 2, wherein said sequentially connecting means is actuable from an initial condition by said initiating means and further including means for resetting said sequentially connecting means to said initial condition.

4. The invention as delineated in claim 3, wherein said sequentially connecting means includes a plurality of electrical contacts each connected to one of said flash lamps via said releasably receiving means and switching means for sequentially engaging said plurality of electrical contacts.

5. The invention as set forth in claim 4, wherein said disabling means includes means for engaging and releasably restraining said switching means from sequentially engaging said electrical contacts.

6. The invention as set forth in claim 5, further including a standby contact and wherein said switching means is in engagement with said standby contact when said sequentially engaging means is in said initial condition.

7. The invention as recited in claim 6, wherein each of said lamps includes two input terminals and one such terminal of each lamp is electrically connected to a discrete contact and the other such terminal of each lamp is connected to one side of said power supply upon insertion of said array into said releasably receiving means.

8. The invention as delineated in claim 7, wherein said switching means includes a shaft rotatably secured to said camera and conductive means connected to said shaft and extending radially therefrom to sequentially engage said contacts in response to the rotation of said shaft.

9. The invention as recited in claim 8, further including motor means connected to said shaft for effecting the rotation thereof and means for securing said shaft in an initial position corresponding to said initial condition.

10. The invention pursuant to claim 9, wherein said initial position securing means includes a ratchet wheel connected to said shaft and rotatable therewith and pawl means movable from a position engaging and restraining said ratchet wheel to a position out of engagement therewith in response to actuation of said initiating means whereby said shaft may be rotated by said motor means.

11. The invention as defined in claim 10, wherein said motor means comprises a spring motor and further including means for automatically returning said pawl means into engagement with said ratchet wheel subsequent to the actuation of said initiating means to releasably secure said shaft and said ratchet wheel in said initial position upon their return thereto.

12. The invention as delineated in claim 4, wherein said switching means includes a shaft rotatably secured to said camera and conductive means connected to said shaft and extending radially therefrom to sequentially engage said contacts in response to the rotation of said shaft.

13. The invention as recited in claim 12, further including motor means connected to said shaft for effecting the rotation thereof and means for securing said shaft in an initial position corresponding to said initial condition.

14. The invention pursuant to claim 5, wherein said disabling means includes latching means for intercepting said switching means upon the ignition of one of said flash lamps to thereby prevent said switching means for engaging the next sequential electrical contact.

15. The invention as described in claim 14, wherein said electrical contacts are disposed in fixed spaced relation and said latching means includes a plurality of fingers or the like adapted to extend between said electrical contacts and intercept said switching means upon the ignition of a flash lamp.

16. The invention pursuant to claim 15, wherein said switching means includes an electrically conductive arm rotatably connected to said camera so as to wipe each of said electrical contacts in the course of completing one revolution.

17. Means for use with a power supply and a photographic camera, having a photographic exposure initiating means, for sequentially and automatically selecting operative flash lamps from an array of operative and inoperative lamps whereby successful photographic exposures may be insured, including:
   means for electrically contacting each of the lamps in said array;
   means connectable to said initiating means for sequentially connecting said power supply to discrete ones of said lamps in said array via said connecting means during a single exposure cycle of said camera until one of said lamps is ignited; and
   means for disabling said sequentially contacting means uupon ignition of said one of said lamps.

18. The invention pursuant to claim 17, further including means for resetting said disabling means and enabling the sequential connection of another of said flash lamps to said power supply.

19. The invention pursuant to claim 18, wherein said sequentially connecting means is actuable from an initial condition by said initiating means and further including means for resetting said sequentially connecting means to said initial condition following the ignition of the last operative one of said flash lamps.

20. The invention as delineated in claim 19, wherein said sequentially connecting means includes a plurality of electrical contacts each connected to one of said flash lamps via said electrically contacting means and switching means for sequentially engaging said plurality of electrical contacts.

21. The invention as set forth in claim 20, wherein said disabling means includes means for engaging and releasably restraining said switching means from sequentially engaging said electrical contacts.

22. The invention as set forth in claim 21, further including a standby contact and wherein said switching means is in engagement with said standby contact when said sequentially engaging means is in said initial condition.

23. The invention as recited in claim 22, wherein each of said lamps includes two input terminals and one such terminal of each lamp is electrically connected to a discrete contact and the other such terminal of each lamp is connected to one side of said power supply upon insertion of said array into said releasably receiving means.

24. The invention as delineated in claim 23, wherein said switching means includes a shaft rotatably secured to said camera and conductive means connected to said shaft and extending radially therefrom to sequentially engage said contacts in response to the rotation of said shaft.

25. The invention as recited in claim 24, further including motor means connected to said shaft for effecting the rotation thereof and means for securing said shaft in an initial position corresponding to said initial condition.

26. The invention pursuant to claim 25, wherein said initial position securing means includes a ratchet wheel connected to said shaft and rotatable therewith and pawl means movable from a position engaging and restraining said ratchet wheel to a position out of engagement therewith in response to actuation of said initiating means whereby said shaft may be rotated by said motor means.

27. The invention as defined in claim 26, wherein said motor means comprises a spring motor and further including means for automatically returning said pawl means into engagement with said ratchet wheel subsequent to the actuation of said initiating means to releasably secure said shaft and said ratchet wheel in said initial position upon their return thereto.

28. The invention as delineated in claim 20, wherein said switching means includes a shaft rotatably secured to said camera and conductive means connected to said shaft and extending radially therefrom to sequentially engage said contacts in response to the rotation of said shaft.

29. The invention as recited in claim 28, further including motor means connected to said shaft for effecting the rotation thereof and means for securing said shaft in an initial position corresponding to said initial condition.

30. The invention pursuant to claim 21, wherein said disabling means includes latching means for intercepting said switching means upon the ignition of one of said flash lamps to thereby prevent said switching means from engaging the next sequential electrical contact.

31. The invention as described in claim 30, wherein said electrical contacts are disposed in fixed spaced relation and said latching means includes a plurality of fingers or the like adapted to extend between said electrical contacts and intercept said switching means upon the ignition of a flash lamp.

32. The invention pursuant to claim 31, wherein said switching means includes an electrically conductive arm rotatably connected to said camera so as to wipe each of said electrical contacts in the course of completing one revolution.

33. A photographic camera operable in conjunction with an array of flash lamps for effecting artificially illuminated photographic exposures, the array of flash lamps including a pair of input terminals in electrical communication with each flash lamp thereof, said camera comprising:
 means for initiating a photographic exposure cycle;
 means for mounting the array of flash lamps and a source of electrical energy; and
 means for firing the flash lamps in a predetermined sequence with one flash lamp only being fired responsive to each operation of said exposure cycle initiating means, said firing means including:
 means for sequentially coupling each pair of the input terminals to the source of electrical energy to facilitate the sequential firing of the flash lamps, said sequentially coupling means including a displaceably mounted electrical contact member arranged to sequentially couple the source of electrical energy to the pairs of input terminals;
 means responsive to the operation of said exposure cycle initiating means for rendering said sequentially coupling means operative; and
 means responsive to the firing of each of the flash lamps for interrupting the displacement of said electrical contact member before it effects the electrical coupling of the source of electrical energy to the pair of input terminals associated with the next unfired flash lamp.

* * * * *

Disclaimer 3,903,533.—*Walter G. Lehmann*, Somerville, Mass. PHOTOGRAPHIC CAMERA AND FLASH LAMP SELECTION SYSTEM. Patent dated Sept. 2, 1975. Disclaimer filed Apr. 5, 1976, by the assignee, *Polaroid Corporation*.

Hereby enters this disclaimer to claims 1, 2, 3, 4, 12, 13, 17, 18, 19, 20, 28 and 29 of said patent.

[*Official Gazette June 1, 1976.*]